(12) United States Patent
Takuda

(10) Patent No.: US 9,963,142 B2
(45) Date of Patent: May 8, 2018

(54) DRIVING DEVICE FOR VEHICLE

(71) Applicant: Toyota Jidosha Kabushiki Kaisha, Toyota-shi, Aichi-ken (JP)

(72) Inventor: Noritaka Takuda, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days. days.

(21) Appl. No.: 15/219,548

(22) Filed: Jul. 26, 2016

(65) Prior Publication Data

US 2017/0036672 A1  Feb. 9, 2017

(30) Foreign Application Priority Data

Aug. 7, 2015  (JP) .................. 2015-156854

(51) Int. Cl.
*B60W 10/08* (2006.01)
*B60L 15/08* (2006.01)
(Continued)

(52) U.S. Cl.
CPC .............. *B60W 20/50* (2013.01); *B60K 6/365* (2013.01); *B60K 6/40* (2013.01); *B60K 6/445* (2013.01); *B60K 6/448* (2013.01); *B60L 11/08* (2013.01); *B60L 15/08* (2013.01); *B60W 10/06* (2013.01); *B60W 10/08* (2013.01); *B60W 2050/0008* (2013.01); *B60W 2050/0095* (2013.01);
(Continued)

(58) Field of Classification Search
CPC ........ B60K 6/365; B60K 6/445; B60K 6/448; B60K 6/40; B60W 2510/0638; B60W 2710/086; B60W 2710/0644; B60W 2050/0095; B60W 2050/0008; B60W 2050/0295; B60W 20/50; B60W 10/08; B60W 10/06; Y10S 903/91; Y10S 903/93; Y10S 903/951; B60Y 2306/13; B60Y 2300/188; B60Y 2300/182; B60Y 2200/92; B60L 15/08; B60L 11/08; Y02T 10/6239; Y02T 10/6286
USPC .......................................................... 701/22
See application file for complete search history.

(56) References Cited

U.S. PATENT DOCUMENTS 7,237,634 B2 * 7/2007 Severinsky ............ B60H 1/004
                                                 180/65.23
9,283,948 B2 * 3/2016 Tanaka ..................... B60K 6/34
(Continued)

FOREIGN PATENT DOCUMENTS

JP  2013-103514 A  5/2013

*Primary Examiner* — Atul Trivedi
(74) *Attorney, Agent, or Firm* — Dinsmore & Shohl LLP

(57) ABSTRACT

A vehicle includes an engine, a first MG (motor generator), a second MG, a planetary gear mechanism provided among the engine, the first MG and the second MG, a battery, and an ECU. The ECU executes batteryless travel control when the battery is abnormal. The batteryless travel control includes engine F/B control for controlling a rotation speed of the engine to become a target rotation speed, and power balance control for controlling a requested driving force to be output and allowing a power generated by the first MG to become equal to a power discharged by the second MG. When the rotation speed of the engine is higher than a threshold speed higher by a prescribed value than the target rotation speed while the batteryless travel control is in execution, the ECU decreases the requested driving force.

3 Claims, 12 Drawing Sheets

(51) Int. Cl.
  *B60K 6/365* (2007.10)
  *B60K 6/448* (2007.10)
  *B60L 11/08* (2006.01)
  *B60W 10/06* (2006.01)
  *B60K 6/40* (2007.10)
  *B60W 20/50* (2016.01)
  *B60K 6/445* (2007.10)
  *B60W 50/00* (2006.01)
  *B60W 50/029* (2012.01)

(52) U.S. Cl.
  CPC ............... *B60W 2050/0295* (2013.01); *B60W 2510/0638* (2013.01); *B60W 2710/0644* (2013.01); *B60W 2710/086* (2013.01); *B60Y 2200/92* (2013.01); *B60Y 2300/182* (2013.01); *B60Y 2300/188* (2013.01); *B60Y 2306/13* (2013.01); *Y02T 10/6239* (2013.01); *Y02T 10/6286* (2013.01); *Y10S 903/91* (2013.01); *Y10S 903/93* (2013.01); *Y10S 903/951* (2013.01)

(56) References Cited

U.S. PATENT DOCUMENTS

| | | | | |
|---|---|---|---|---|
| 2001/0041955 A1* | 11/2001 | Nada | ........... | B60K 6/445 701/29.2 |
| 2006/0219447 A1* | 10/2006 | Saitou | ........... | B60W 10/24 180/65.235 |
| 2007/0270267 A1* | 11/2007 | Miller | ........... | B62D 5/0409 475/189 |
| 2009/0159350 A1* | 6/2009 | Hanada | ........... | B60K 6/365 180/65.265 |
| 2010/0012408 A1* | 1/2010 | Takasaki | ........... | B60K 6/365 180/65.25 |
| 2010/0151988 A1* | 6/2010 | Tabata | ........... | B60K 6/442 477/3 |
| 2010/0298090 A1* | 11/2010 | Sah | ........... | B60K 6/365 477/5 |
| 2012/0072062 A1* | 3/2012 | Ando | ........... | B60K 6/365 701/22 |
| 2012/0203415 A1* | 8/2012 | Akutsu | ........... | B60K 6/26 701/22 |
| 2013/0166131 A1* | 6/2013 | Shiiba | ........... | B60K 6/365 701/22 |
| 2014/0081499 A1* | 3/2014 | Ito | ........... | B60K 6/445 701/22 |
| 2014/0081500 A1* | 3/2014 | Ito | ........... | B60W 20/13 701/22 |
| 2014/0288756 A1* | 9/2014 | Tanaka | ........... | B60K 6/34 701/22 |
| 2014/0309831 A1* | 10/2014 | Tanaka | ........... | B60K 6/34 701/22 |

\* cited by examiner

FIG.4

| CONTROL SCHEME | PWM CONTROL MODE | | RECTANGULAR WAVE CONTROL MODE |
|---|---|---|---|
| | SINUSOIDAL WAVE PWM | OVERMODULATION PWM | RECTANGULAR WAVE (1 PULSE) |
| OUTPUT VOLTAGE WAVEFORM OF INVERTER | BASIC WAVE COMPONENT | BASIC WAVE COMPONENT | BASIC WAVE COMPONENT |
| MODULATION FACTOR | 0~APPROXIMATELY 0.61 | HIGHEST VALUE IN SINUSOIDAL WAVE PWM~0.78 | 0.78 |
| CHARACTERISTICS | TORQUE FLUCTUATIONS ARE SMALL | OUTPUT IN MEDIUM SPEED RANGE IS ENHANCED | OUTPUT IN HIGH SPEED RANGE IS ENHANCED |

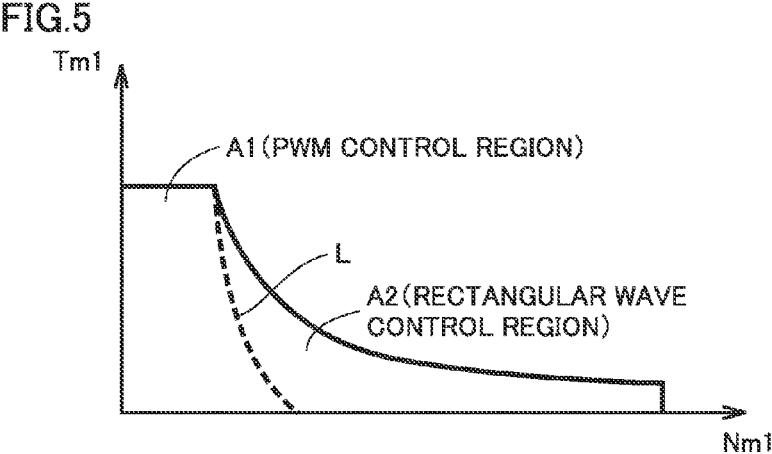

FIG.5

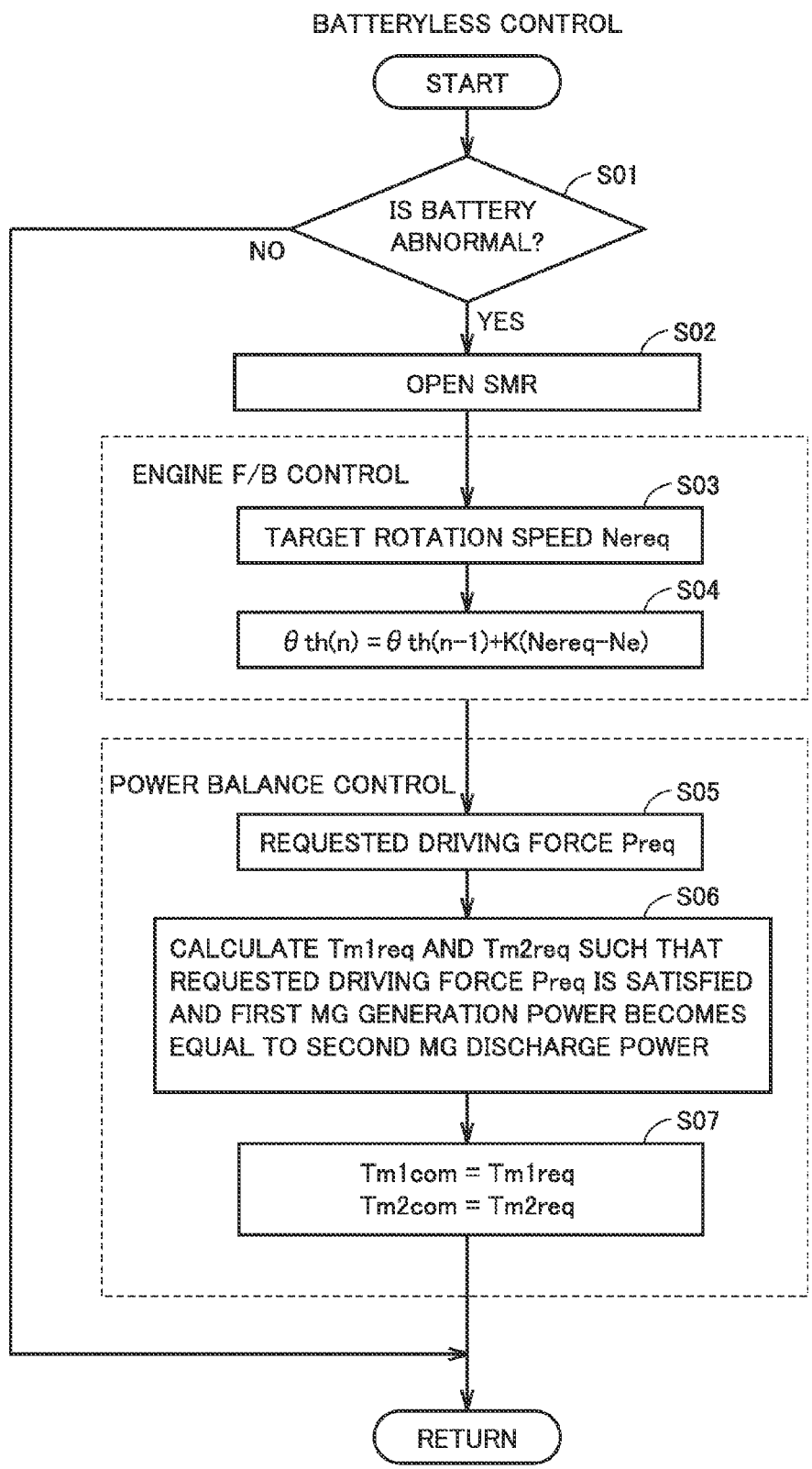

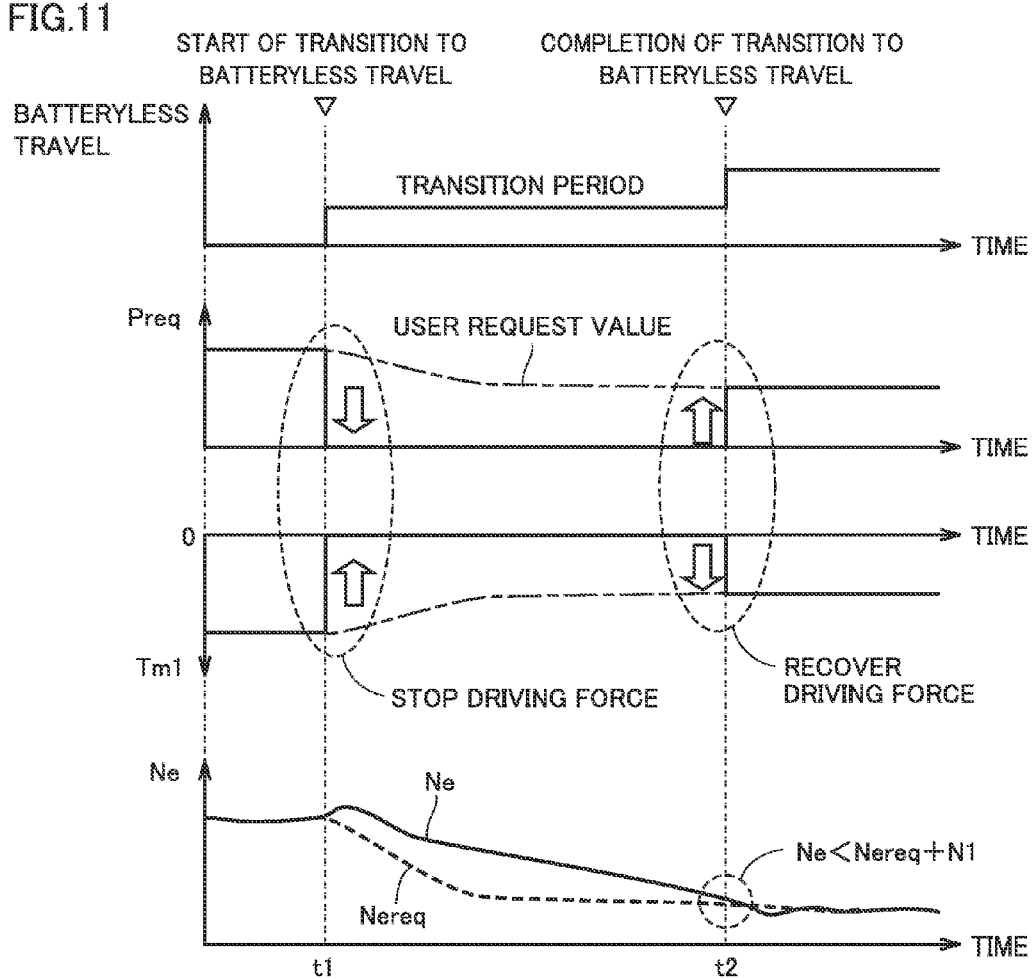

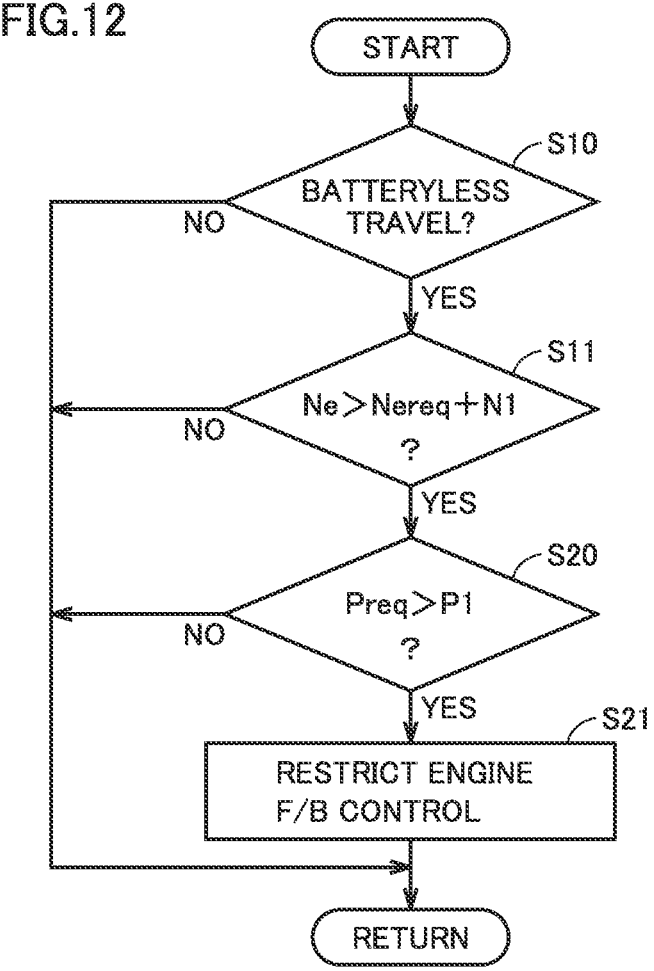

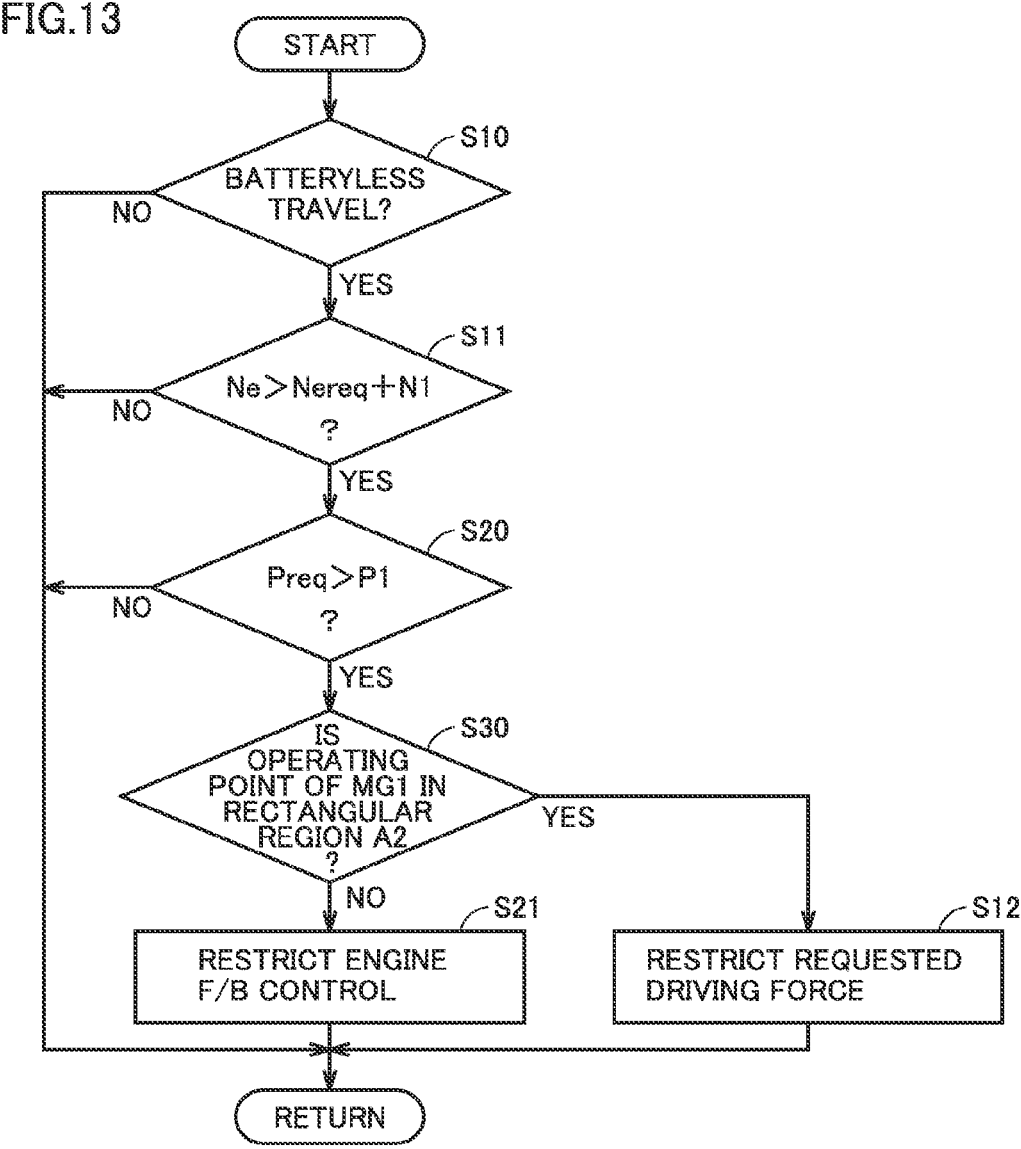

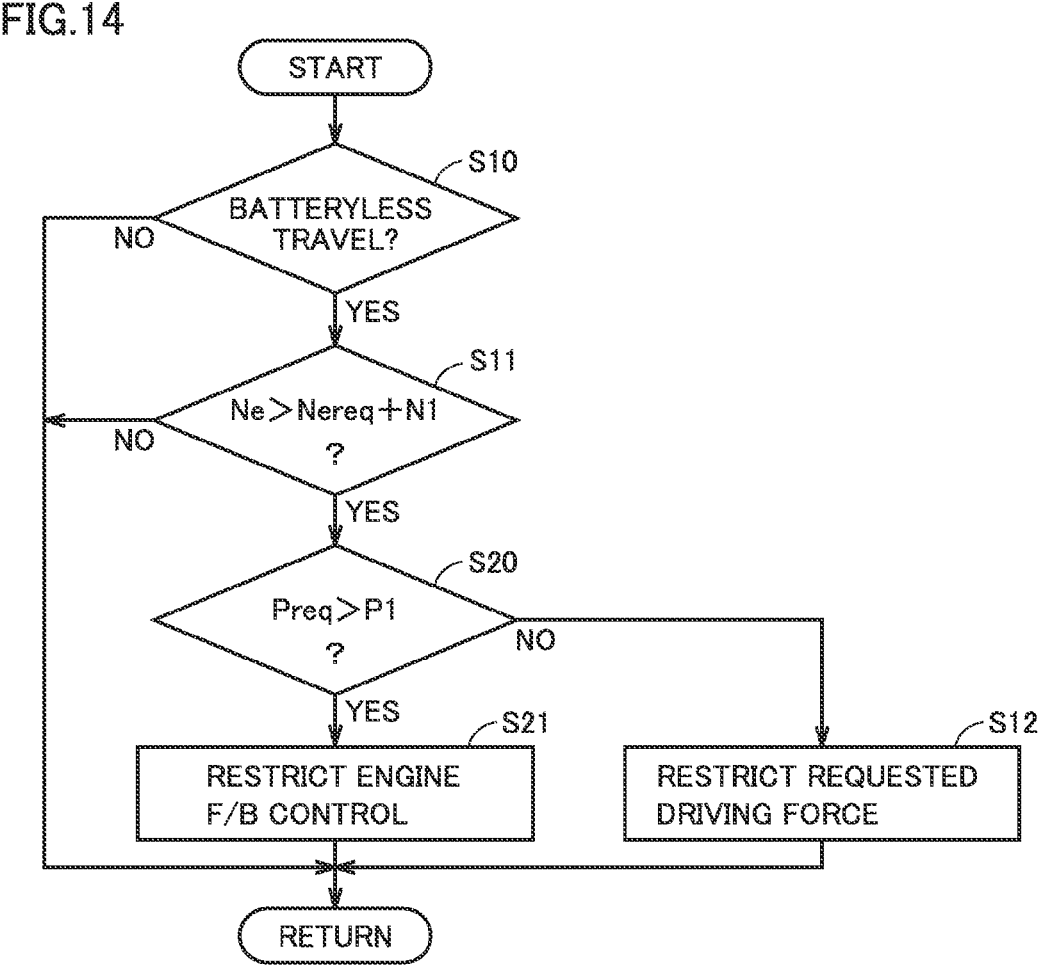

DRIVING DEVICE FOR VEHICLE

CROSS-REFERENCE TO RELATED APPLICATIONS

This application claims priority to Japanese Patent Application No. 2015-156854 filed on Aug. 7, 2015, the entire contents of which are hereby incorporated by reference.

BACKGROUND

Field

The present disclosure relates to a driving device for a vehicle, and particularly to a driving device for a vehicle that travels by using at least one of the motive power of an engine and the motive power of a rotating electric machine (motor generator).

Description of the Background Art

Japanese Patent Laying-Open No. 2013-103514 discloses a hybrid vehicle including: an engine; a first rotating electric machine; a second rotating electric machine connected to a driving wheel; a planetary gear mechanism connecting the engine, the first rotating electric machine and the second rotating electric machine; and a battery configured to be connectable to the first rotating electric machine and the second rotating electric machine, wherein the battery is separated from the first rotating electric machine and the second rotating electric machine and batteryless travel control is executed when the battery fails.

During the batteryless travel control, the process for executing feedback control of an engine output such that a rotation speed of the engine becomes a target rotation speed (hereinafter also referred to as "engine F/B control") and the process for controlling the first rotating electric machine and the second rotating electric machine such that a driving force requested by a user is output to the driving wheel and the electric power generated by the first rotating electric machine becomes equal to the electric power consumed by the second rotating electric machine (hereinafter also referred to as "power balance control") are executed simultaneously.

SUMMARY

However, when an attempt is made to generate the driving force in a state where the engine rotation speed is deviating to the side higher than the target rotation speed during the batteryless travel control, it is concerned that the engine rotation speed drops and a power balance by the power balance control is broken.

Namely, when an attempt is made to generate the driving force in a state where the engine rotation speed is higher than the target rotation speed during the batteryless travel control, the engine F/B control functions to decrease the engine rotation speed, and in addition, the power generation torque of the first rotating electric machine by the power balance control functions to decrease the engine rotation speed. Therefore, it is concerned that the engine rotation speed drops sharply. When this drop in engine rotation speed Ne causes a rotation speed of the first rotating electric machine to decrease as well, it is concerned that the electric power generated by the first rotating electric machine decreases and the power balance by the power balance control is broken.

The present disclosure has been made to solve the aforementioned problem and an object of the present disclosure is to suppress a drop in engine rotation speed when the driving force is generated in a state where the engine rotation speed is higher than the target rotation speed during the batteryless travel control.

(1) A driving device for a vehicle according to an aspect of the present disclosure includes: an engine; a first rotating electric machine; a second rotating electric machine connected to a driving wheel; a planetary gear mechanism having a rotating element connected to the engine, a rotating element connected to the first rotating electric machine, and a rotating element connected to the second rotating electric machine, the planetary gear mechanism mechanically connecting the engine, the first rotating electric machine and the second rotating electric machine such that when a rotation speed of one of the engine and the first rotating electric machine decreases in a case where a rotation speed of the second rotating electric machine is constant, a rotation speed of the other of the engine and the first rotating electric machine decreases; a battery configured to be electrically connectable to the first rotating electric machine and the second rotating electric machine; and a controller configured, when the battery is abnormal, to disconnect the battery from the first rotating electric machine and the second rotating electric machine and to execute batteryless travel control.

The batteryless travel control is control that executes (i) engine feedback control for executing feedback control of the engine such that the rotation speed of the engine becomes a target rotation speed, and (ii) power balance control for controlling the first rotating electric machine and the second rotating electric machine such that a power corresponding to a requested driving force is transmitted to the driving wheel and a power generated by the first rotating electric machine becomes equal to a power consumed by the second rotating electric machine.

When the rotation speed of the engine is higher than a threshold speed higher than the target rotation speed during the batteryless travel control, the controller is configured to set a value of the requested driving force used for the power balance control to be smaller than that when the rotation speed of the engine is lower than the threshold speed.

According to such a configuration, when the rotation speed of the engine is higher than the threshold speed higher than the target rotation speed while the batteryless travel control is in execution, the requested driving force is restricted to a small value. Since the requested driving force is restricted, the power generation torque of the first rotating electric machine by the power balance control is reduced. As a result, the function of the power balance control decreasing the rotation speed of the engine can be suppressed. Therefore, a drop in rotation speed of the engine can be suppressed as compared with the case of not restricting the requested driving force.

(2) The first rotating electric machine is controlled (i) in a pulse width modulation control mode when the rotation speed of the first rotating electric machine is lower than a prescribed value, and (ii) in a rectangular wave control mode when the rotation speed of the first rotating electric machine is higher than the prescribed value. When the rotation speed of the engine is higher than the threshold speed and the first rotating electric machine is controlled in the rectangular wave control mode during the batteryless travel control, the controller is configured to set the value of the requested driving force to be smaller than that when the rotation speed of the engine is lower than the threshold speed, and when the rotation speed of the engine is higher than the threshold speed and the first rotating electric machine is controlled in the pulse width modulation control mode during the batteryless travel control, the controller is configured to execute at least one of a first process and a second process, the first process being a process for decreasing a gain used for the engine feedback control as compared with the gain when the rotation speed of the engine is lower than the threshold speed, the second process being a process for increasing the target rotation speed as compared with the target rotation speed when the rotation speed of the engine is lower than the threshold speed.

According to such a configuration, when the first rotating electric machine is controlled in the rectangular wave control mode, a drop in rotation speed of the engine is prevented by restricting the requested driving force, not by restricting the function of the engine feedback control. Therefore, as compared with the case of restricting the function of the engine feedback control, the situation in which the rotation speed of the engine remains at a value higher than the target rotation speed is suppressed, and thus, the situation in which the rotation speed of the first rotating electric machine remains at a high value is also suppressed. As a result, the control mode of the first rotating electric machine can be encouraged to switch to the pulse width modulation control mode that is superior in control accuracy to the rectangular wave control mode. When the control mode of the first rotating electric machine switches to the pulse width modulation control mode, the power balance by the power balance control can be controlled accurately. On the other hand, when the first rotating electric machine is controlled in the pulse width modulation control mode, a drop in rotation speed of the engine is prevented by restricting the function of the engine feedback control, not by restricting the requested driving force. Therefore, a drop in rotation speed of the engine can be prevented without restricting the driving force.

(3) A driving device for a vehicle according to another aspect of the present disclosure includes: an engine; a first rotating electric machine; a second rotating electric machine connected to a driving wheel; a planetary gear mechanism having a rotating element connected to the engine, a rotating element connected to the first rotating electric machine, and a rotating element connected to the second rotating electric machine, the planetary gear mechanism mechanically connecting the engine, the first rotating electric machine and the second rotating electric machine such that when a rotation speed of one of the engine and the first rotating electric machine decreases in a case where a rotation speed of the second rotating electric machine is constant, a rotation speed of the other of the engine and the first rotating electric machine decreases; a battery configured to be electrically connectable to the first rotating electric machine and the second rotating electric machine; and a controller configured, when the battery is abnormal, to disconnect the battery from the first rotating electric machine and the second rotating electric machine and to execute batteryless travel control.

The batteryless travel control is control that executes (i) engine feedback control for executing feedback control of the engine such that the rotation speed of the engine becomes a target rotation speed, and (ii) power balance control for controlling the first rotating electric machine and the second rotating electric machine such that a power corresponding to a requested driving force is transmitted to the driving wheel and a power generated by the first rotating electric machine becomes equal to a power consumed by the second rotating electric machine.

When the rotation speed of the engine is higher than a threshold speed higher than the target rotation speed and the requested driving force is greater than a threshold driving force during the batteryless travel control, the controller is configured to execute at least one of a first process and a second process, the first process being a process for decreasing a gain used for the engine feedback control as compared with the gain at least one of when the rotation speed of the engine is lower than the threshold speed and when the requested driving force is smaller than the threshold driving force, the second process being a process for increasing the target rotation speed as compared with the target rotation speed at least one of when the rotation speed of the engine is lower than the threshold speed and when the requested driving force is smaller than the threshold driving force.

According to such a configuration, when the rotation speed of the engine is higher than the threshold speed higher than the target rotation speed and the requested driving force is greater than the threshold driving force while the batteryless travel control is in execution, at least one of the process for decreasing the gain used for the engine feedback control and the process for increasing the target rotation speed is executed. As a result, the function of the engine feedback control is restricted. Namely, the function of the engine feedback control decreasing the rotation speed of the engine is suppressed. Therefore, a drop in rotation speed of the engine can be suppressed as compared with the case of not restricting the function of the engine feedback control.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 4 is a diagram schematically describing a control mode of a first MG.
FIG. 5 is a diagram showing a correspondence relation between an operating point of the first MG and the control mode of the first MG.
FIG. 6 is a flowchart (No. 1) showing a process procedure by an ECU.
FIG. 11 is a diagram showing a manner of change in requested driving force Preq, first MG torque Tm1 and engine rotation speed Ne at the start of the batteryless travel control.
FIG. 12 is a flowchart (No. 4) showing a process procedure by the ECU.
FIG. 13 is a flowchart (No. 5) showing a process procedure by the ECU.
FIG. 14 is a flowchart (No. 6) showing a process procedure by the ECU.

DETAILED DESCRIPTION

Figure 1:
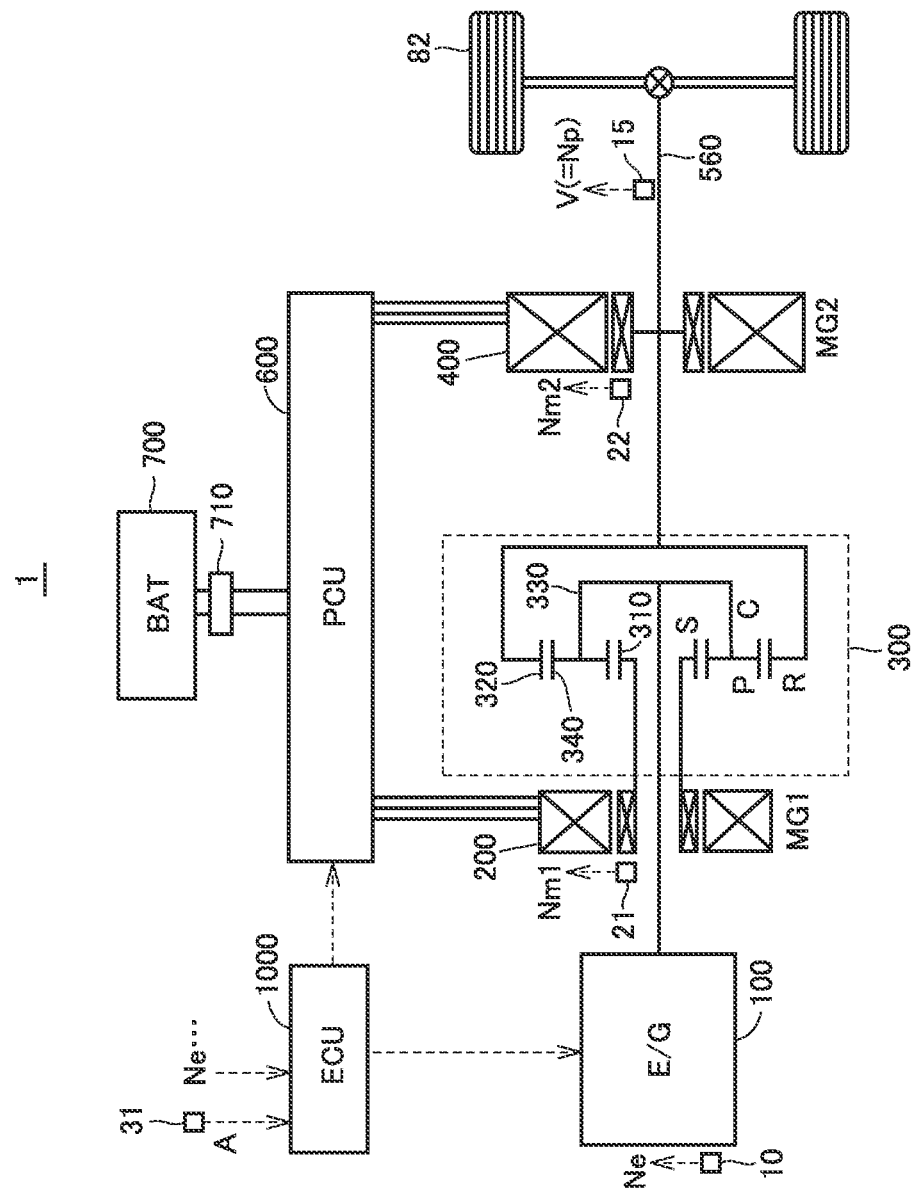
FIG. 1 is an overall block diagram of a vehicle.

Embodiments of the present disclosure will be described hereinafter with reference to the drawings. In the following description, the same components are indicated by the same reference characters. Their names and functions are also the same. Therefore, detailed description of them will not be repeated.

First Embodiment

FIG. 1 is an overall block diagram of a vehicle 1 according to the present embodiment. Vehicle 1 includes an engine 100, a first MG (Motor Generator) 200, a power split device 300, a second MG 400, an output shaft 560, driving wheels 82, a PCU (Power Control Unit) 600, a battery 700, an SMR (System Main Relay) 710, and an ECU (Electronic Control Unit) 1000.

Engine 100 is an internal combustion engine that burns a fuel and outputs the motive power. Each of first MG 200 and second MG 400 is an AC rotating electric machine and functions both as a motor and a generator. Hereinafter, a rotation speed of engine 100 may be denoted as "engine rotation speed Ne", a rotation speed of first MG 200 may be denoted as "first MG rotation speed Nm1", and a rotation speed of second MG 400 may be denoted as "second MG rotation speed Nm2". In addition, the torque of engine 100 may be denoted as "engine torque Te", the torque of first MG 200 may be denoted as "first MG torque Tm1", and the torque of second MG 400 may be denoted as "second MG torque Tm2".

Power split device 300 is a planetary gear mechanism having a sun gear (S) 310, a ring gear (R) 320, a pinion gear (P) 340 engaged with sun gear (S) 310 and ring gear (R) 320, and a carrier (C) 330 holding pinion gear (P) 340 in a freely rotating and revolving manner. Carrier (C) 330 is coupled to engine 100. Sun gear (S) 310 is coupled to first MG 200. Ring gear (R) 320 is coupled to second MG 400 and driving wheels 82 by output shaft 560.

Figure 2:
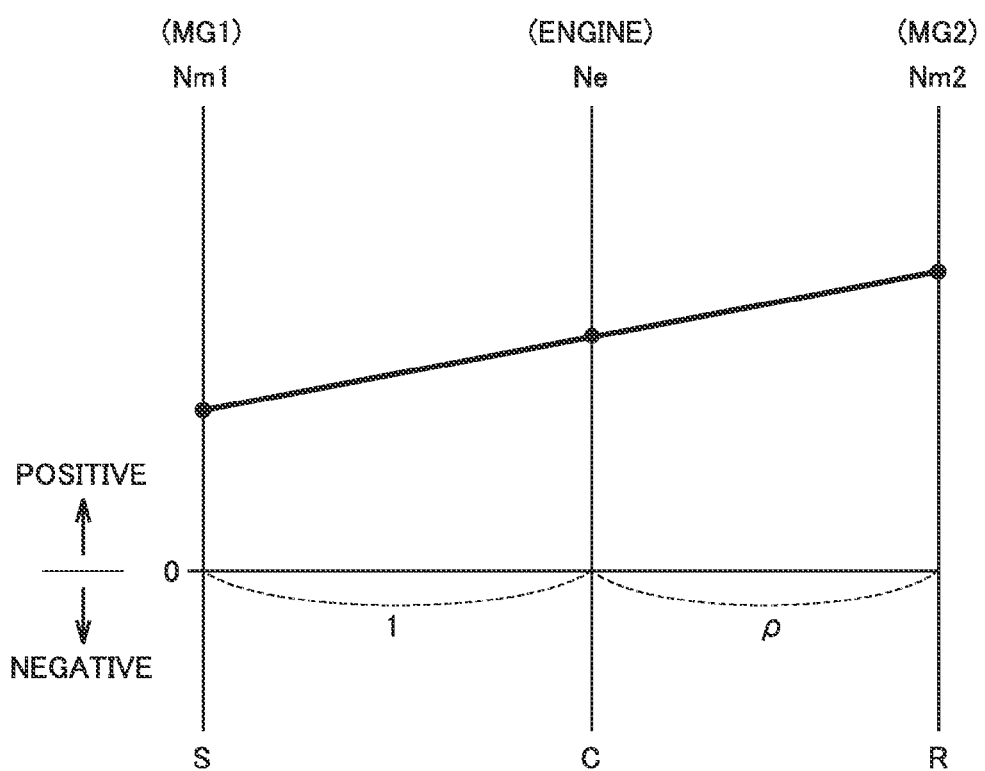
FIG. 2 is a nomographic chart of a power split device.

FIG. 2 is a nomographic chart of power split device 300. Since power split device 300 is configured as described above, first MG rotation speed Nm1 (rotation speed of sun gear (S) 310), engine rotation speed Ne (rotation speed of carrier (C) 330) and second MG rotation speed Nm2 (rotation speed of ring gear (R) 320) have such a relation that they are connected by a straight line on the nomographic chart of power split device 300 (such a relation that when any two of the rotation speeds are determined, the rest of the rotation speeds is also determined). Therefore, when one of engine rotation speed Ne and first MG rotation speed Nm1 decreases in a case where second MG rotation speed Nm2 is constant, the other rotation speed decreases as well. Namely, power split device 300 mechanically connects engine 100, first MG 200 and second MG 400 such that when one of engine rotation speed Ne and first MG rotation speed Nm1 decreases, the other rotation speed decreases as well.

Returning to FIG. 1, output shaft 560 is rotated by at least one of the motive power of second MG 400 and the motive power of engine 100 transmitted through power split device 300. The rotational force of output shaft 560 is transmitted to right and left driving wheels 82 through a differential gear. As a result, vehicle 1 runs.

PCU 600 converts high-voltage DC power supplied from battery 700 into AC power and outputs the AC power to first MG 200 and/or second MG 400. As a result, first MG 200 and/or second MG 400 is/are driven. PCU 600 also converts AC power generated by first MG 200 and/or second MG 400 into DC power and outputs the DC power to battery 700. As a result, battery 700 is charged. In addition, PCU 600 can also drive second MG 400 by using the electric power generated by first MG 200.

Battery 700 is a secondary battery that stores the high-voltage (e.g., approximately 200 V) DC power for driving first MG 200 and/or second MG 400. Battery 700 is typically configured to include a nickel-metal hydride battery or a lithium ion battery.

SMR 710 is a relay for connecting and separating battery 700 and an electrical system including PCU 600, first MG 200 and second MG 400.

Vehicle 1 is further provided with an engine rotation speed sensor 10, an output shaft rotation speed sensor 15, resolvers 21 and 22, an accelerator position sensor 31 and the like. Engine rotation speed sensor 10 detects engine rotation speed Ne. Output shaft rotation speed sensor 15 detects a rotation speed Np of output shaft 560 as a vehicle speed V. Resolvers 21 and 22 detect first MG rotation speed Nm1 and second MG rotation speed Nm2, respectively. Accelerator position sensor 31 detects an amount of operation of an accelerator pedal by a user (hereinafter also referred to as "accelerator pedal operation amount A"). Each of these sensors outputs the result of detection to ECU 1000.

ECU 1000 has a not-shown CPU (Central Processing Unit) and a not-shown memory embedded therein, and executes the prescribed computation processing based on the information stored in the memory and the information from the sensors. ECU 1000 controls the devices mounted on vehicle 1 based on the result of the computation processing.

Figure 3:
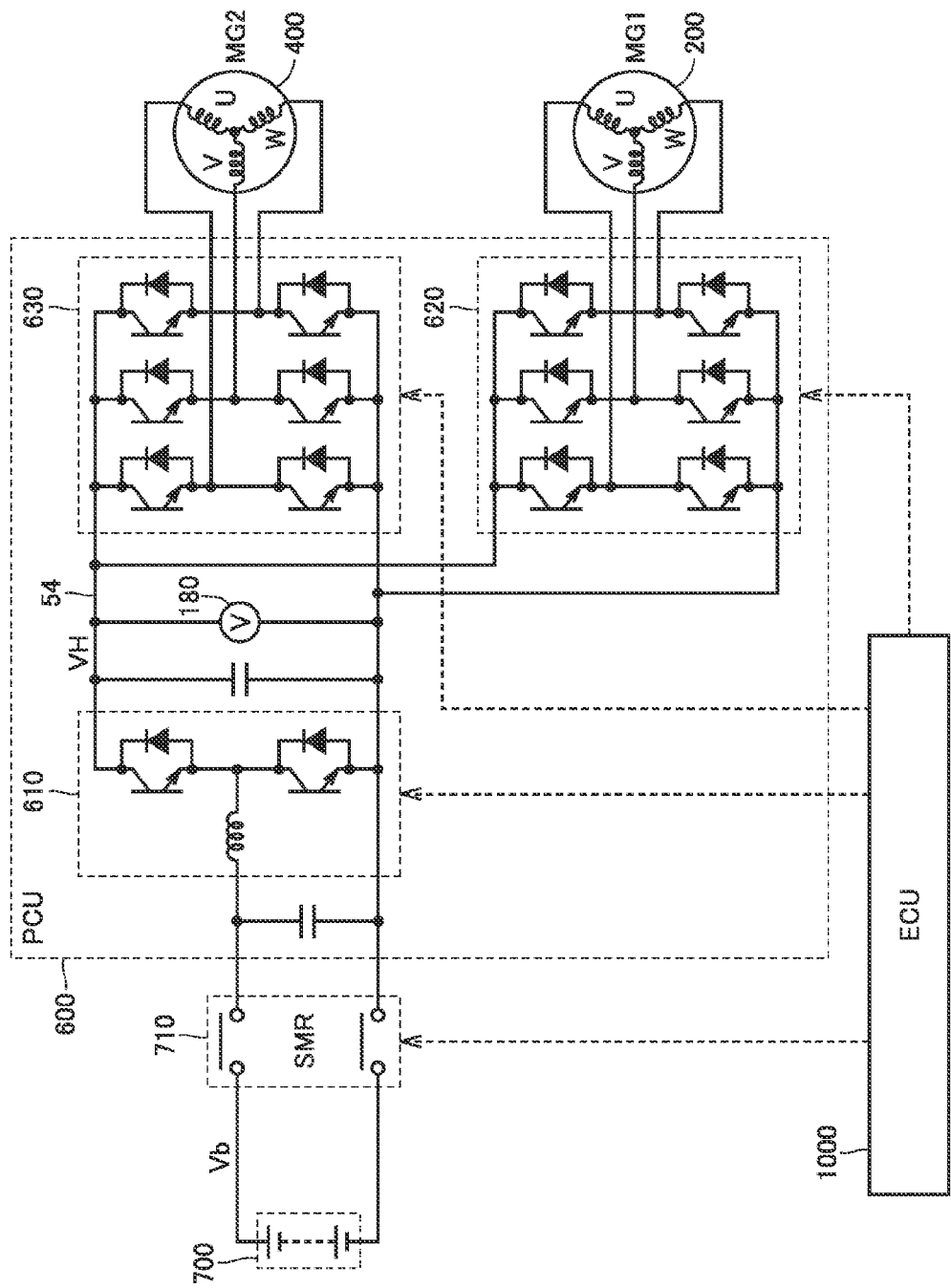
FIG. 3 is a circuit diagram of an electrical system.

FIG. 3 is a circuit diagram of an electrical system for controlling driving of first MG 200 and second MG 400. This electrical system is configured to include first MG 200, second MG 400, PCU 600, battery 700, SMR 710, and ECU 1000.

When SMR 710 is opened, battery 700 is separated from the electrical system. When SMR 710 is closed, battery 700 is connected to the electrical system. SMR 710 is controlled (opened and closed) in accordance with a control signal from ECU 1000. For example, when the user requests startup of the electrical system by performing the operation for starting driving, ECU 1000 closes SMR 710.

PCU 600 includes a converter 610 and inverters 620 and 630. Converter 610 is a general voltage boost chopper circuit formed of a reactor and two switching elements. An antiparallel diode is connected to each switching element.

Inverters 620 and 630 are connected in parallel with each other with respect to converter 610. Inverter 620 is connected between converter 610 and first MG 200. Inverter 630 is connected between converter 610 and second MG 400. Each of inverters 620 and 630 has a general three-phase inverter configuration. Namely, each of inverters 620 and 630 includes upper and lower arms for three phases (a U phase, a V phase and a W phase) and antiparallel diodes provided in the arms.

A DC voltage (hereinafter also referred to as "system voltage VH") on a power line 54 between converter 610 and inverters 620 and 630 is detected by a voltage sensor 180. The result of detection by voltage sensor 180 is output to ECU 1000.

Converter 610 performs bidirectional DC voltage conversion between system voltage VH and a voltage Vb of battery 700. Inverter 620 converts system voltage VH into an AC voltage by turning on and off the switching elements. The converted AC voltage is supplied to first MG 200. Inverter 620 also converts AC power generated by first MG 200 into DC power. Similarly, inverter 630 converts system voltage VH into an AC voltage and supplies the AC voltage to second MG 400. Inverter 630 also converts AC power generated by second MG 400 into DC power.

As described above, power line 54 electrically connecting converter 610 and inverters 620 and 630 is configured as a power line shared by inverters 620 and 630. Since power line 54 is electrically connected to both first MG 200 and second MG 400, the electric power generated by one of first MG 200 and second MG 400 can be consumed by the other.

In a state where SMR 710 is closed and battery 700 is connected to the electrical system, battery 700 can be used as a power buffer, and thus, the electric power is received and transmitted between battery 700 and first and second MGs 200 and 400. In contrast, in a state where SMR 710 is opened and battery 700 is separated from the electrical system, battery 700 cannot be used as a power buffer, and thus, the electric power must be balanced between first MG 200 and second MG 400.

ECU 1000 controls driving of first MG 200 and second MG 400 by controlling the switching operation in inverters 620 and 630, respectively.

<Control Mode of First MG 200>

FIG. 4 is a diagram schematically describing a control mode of first MG 200. In vehicle 1 according to the present embodiment, the control mode of first MG 200 is switched to either a pulse width modulation (hereinafter also referred to as "PWM") control mode or a rectangular wave control mode.

In the PWM control mode, either sinusoidal wave PWM control or overmodulation PWM control is executed.

The sinusoidal wave PWM control is used as a general PWM control scheme and controls ON and OFF of the switching elements in each of the phase arms of inverter 620 in accordance with voltage comparison between a sinusoidal wave-like voltage command value and a carrier wave (carrier signal). As a result, a basic wave component of a line voltage (hereinafter also simply referred to as "inverter output voltage") output from inverter 620 to first MG 200 within a certain time period becomes a pseudo sinusoidal wave. As is well known, in the sinusoidal wave PWM control, an amplitude of the basic wave component of the inverter output voltage can be increased only to approximately 0.61 times as great as that of the inverter input voltage (a modulation factor can be increased only to 0.61).

In the overmodulation PWM control, an amplitude of the carrier wave is distorted to decrease and the PWM control similar to the aforementioned sinusoidal wave PWM control is executed. As a result, the modulation factor can be increased to a range of 0.61 to 0.78. Therefore, in a region where the PWM control is executed, the sinusoidal wave PWM control is executed when vehicle speed V is relatively low, and the overmodulation PWM control is executed when vehicle speed V is relatively high.

On the other hand, in the rectangular wave control mode, rectangular control is executed. In the rectangular control, the switching operation is performed once within the aforementioned certain time period. As a result, the inverter output voltage within the aforementioned certain time period becomes a rectangular wave voltage corresponding to one pulse. Thus, the rectangular control is inferior in control accuracy (control responsiveness) to the PWM control, while the modulation factor can be increased to 0.78 and a motor output can be increased in the rectangular control.

Taking the difference in characteristics between these control modes into account, ECU 1000 selects the control mode of first MG 200 in accordance with a region to which an operating point of first MG 200 determined by first MG rotation speed Nm1 and first MG torque Tm1 belongs.

FIG. 5 is a diagram showing a correspondence relation between the operating point of first MG 200 and the control mode of first MG 200. In FIG. 5, the horizontal axis indicates first MG rotation speed Nm1, and the vertical axis indicates first MG torque Tm1. In a region A1 on the lower rotation speed side with respect to a control boundary line L shown in FIG. 5, the PWM control mode having relatively good controllability is selected to decrease torque fluctuations. In a region A2 on the higher rotation speed side with respect to control boundary line L, the rectangular wave control mode is selected to increase the output of first MG 200.

Similarly to the control mode of first MG 200, a control mode of second MG 400 is also switched to either the PWM control mode or the rectangular wave control mode. Namely, ECU 1000 selects the control mode of second MG 400 in accordance with a region where an operating point of second MG 400 determined by second MG rotation speed Nm2 and second MG torque Tm2 belongs.

<Batteryless Travel Control>

Next, the batteryless travel control will be described. When an abnormality occurs in battery 700, ECU 1000 opens SMR 710, separates battery 700 from the electrical system (first MG 200, second MG 400 and PCU 600), and executes the batteryless travel control described below.

The batteryless travel control is fail-safe control for causing vehicle 1 to travel by executing "engine F/B control" and "power balance control". "Engine F/B control" is a process for executing feedback control of engine torque Te such that engine rotation speed Ne becomes target rotation speed Nereq. "Power balance control" is a process for controlling first MG 200 and second MG 400 such that the driving force requested by the user is transmitted to driving wheels 82 and the electric power generated by first MG 200 (hereinafter also referred to as "first MG generation power") becomes equal to the electric power consumed by second MG 400 (hereinafter also referred to as "second MG discharge power").

FIG. 6 is a flowchart showing a process procedure when ECU 1000 executes the batteryless travel control. This flowchart is repeatedly performed in prescribed cycles.

In step (hereinafter abbreviated as "S") 01, ECU 1000 determines whether or not battery 700 is abnormal. For example, when the temperature of battery 700 exceeds a threshold temperature, ECU 1000 determines that battery 700 is abnormal. If battery 700 is not abnormal (NO in S01), ECU 1000 ends the process.

If battery 700 is abnormal (YES in S01), ECU 1000 opens SMR 710 and separates battery 700 from the electrical system (first MG 200, second MG 400 and PCU 600) in S02.

Thereafter, ECU 1000 executes "engine F/B control" described above in S03 and S04, and executes "power balance control" described above in S05 to S07.

<<Engine F/B Control>>

ECU 1000 executes the engine F/B control in S03 and S04.

In S03, ECU 1000 sets target rotation speed Nereq of engine 100. For example, ECU 1000 sets target rotation speed Nereq as described below. If engine rotation speed Ne is increased excessively when vehicle speed V is low (i.e., when second MG rotation speed Nm2 is low), first MG rotation speed Nm1 becomes high and the control mode of first MG 200 becomes the rectangular wave control mode (see FIG. 5 described above). During the batteryless travel control, the first MG generation power must be matched with the second MG discharge power by the power balance control described below, and thus, it is desirable that the control mode of first MG 200 is the PWM control mode that is superior in control accuracy to the rectangular wave control mode. From this perspective, ECU 1000 sets target rotation speed Nereq such that an upper limit value of target rotation speed Nereq becomes lower as vehicle speed V becomes lower, in order to prevent the control mode of first MG 200 from becoming the rectangular wave control mode. Then, within a range not exceeding the set upper limit value, ECU 1000 sets target rotation speed Nereq such that target rotation speed Nereq becomes higher as accelerator pedal operation amount A becomes larger.

The method for setting target rotation speed Nereq is not limited to the aforementioned method. For example, a lower limit value of target rotation speed Nereq may be set in order to prevent the power of engine 100 from becoming excessively low even when accelerator pedal operation amount A is very low. In addition, target rotation speed Nereq may be a predetermined fixed value, not a value that fluctuates in accordance with vehicle speed V and accelerator pedal operation amount A.

In S04, ECU 1000 executes feedback control of engine torque Te (specifically, a throttle valve opening degree, an ignition timing, an amount of fuel injection and the like) such that engine rotation speed Ne approaches target rotation speed Nereq.

In the following, description will be given by way of example to a case in which ECU 1000 executes feedback control of the throttle valve opening degree (hereinafter referred to as "throttle opening degree θth") of engine 100 by executing computation in accordance with the following equation (1):

$$\theta th(n) = \theta th(n-1) + K(Nereq - Ne) \quad (1).$$

In the equation (1) above, "θth(n)" represents a throttle opening degree θth in this computation cycle, "θth(n−1)" represents a throttle opening degree θth in the previous computation cycle, and "K" represents a feedback gain (proportional gain).

The computational equation used in the engine F/B control is not limited to the equation (1) described above, and may be other computational equations (e.g., so-called PID control including an integral term and a derivative term in addition to a proportional term). In addition, as described above, the target of the feedback control is not necessarily limited to throttle opening degree θth, and may be the ignition timing, the amount of fuel injection and the like.

<<Power Balance Control>>

ECU 1000 executes the power balance control in S05 to S07. The power balance control is executed independently of the engine F/B control. Therefore, FIG. 6 shows an example of executing the power balance control after executing the engine F/B control. However, the order of executing the engine F/B control and the power balance control may be reverse.

In S05, ECU 1000 calculates the driving force requested for vehicle 1 by the user (hereinafter referred to as "requested driving force Preq"), based on accelerator pedal operation amount A and vehicle speed V (second MG rotation speed Nm2). For example, ECU 1000 prestores a map determining a correspondence relation of accelerator pedal operation amount A and vehicle speed V with requested driving force Preq, and uses this map to calculate requested driving force Preq corresponding to actual accelerator pedal operation amount A and vehicle speed V.

In S06, ECU 1000 calculates the target torque of first MG 200 (hereinafter also referred to as "first MG target torque Tm1req") and the target torque of second MG 400 (hereinafter also referred to as "second MG target torque Tm2req") such that the power corresponding to requested driving force Preq is transmitted to driving wheels 82 and the first MG generation power becomes equal to the second MG discharge power.

Specifically, ECU 1000 calculates first MG target torque Tm1req and second MG target torque Tm2req by solving a simultaneous equation of the following equations (2) and (3) indicating the control state of engine 100, first MG 200 and second MG 400 during the batteryless travel control:

$$Preq = (-Tm1req/\rho) \times Nm2 + Tm2req \times Nm2 \quad (2)$$

$$Tm1req \times Nm1 + Tm2req \times Nm2 = 0 \quad (3).$$

Figure 7:
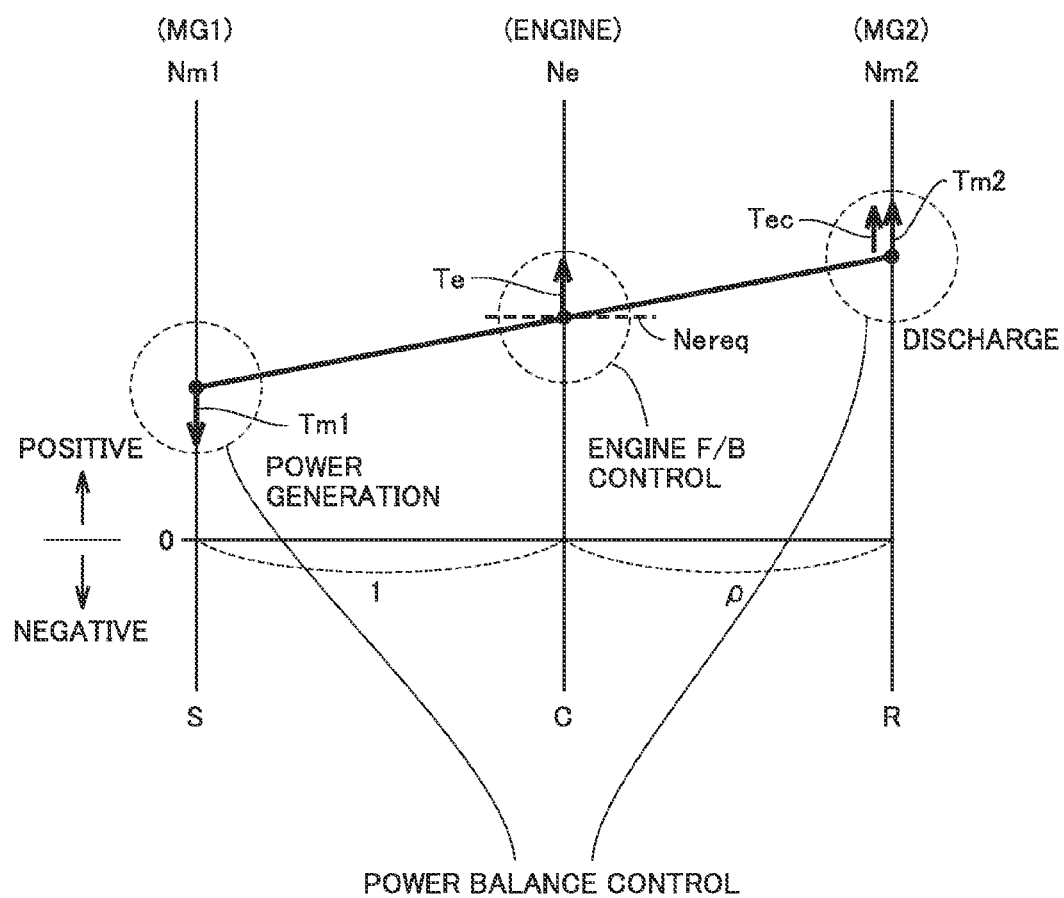
FIG. 7 is a diagram (No. 1) showing a control state during the batteryless travel control.

During the batteryless travel control (during forward movement), engine 100 rotates normally, and first MG 200 rotates normally to generate the power generation torque (torque in the negative direction), and second MG 400 rotates normally to generate the discharge torque (torque in the positive direction), as shown in FIG. 7 described below. Therefore, in the equations (2) and (3), "Tm1req" has a negative value, and "Nm1", "Tm2req" and "Nm2" have positive values.

In the equation (2), "ρ" is a fixed value indicating a planetary gear ratio of power split device 300, and "(−Tm1req/ρ)" represents engine direct torque Tec. Engine direct torque Tec refers to the torque in the positive direction transmitted from engine 100 to ring gear (R) 320 of power split device 300 (i.e., output shaft 560) by using first MG target torque Tm1req as reaction force (see FIG. 7 described below). Therefore, "(−Tm1req/ρ)×Nm2" represents the power transmitted from engine 100 to output shaft 560. In addition, "Tm2req×Nm2" represents the power transmitted from second MG 400 to output shaft 560, i.e., the second MG discharge power. Therefore, the equation (2) is a relational equation indicating that requested driving force Preq is satisfied by a total of the power transmitted from engine 100 to output shaft 560 and the second MG discharge power.

In the equation (3), "Tm1req×Nm1" represents the power generated by first MG 200, i.e., the first MG generation power. As described above, during the batteryless travel control (during forward movement), first MG 200 rotates normally to generate the power generation torque (Nm1>0 and Tm1req<0), and thus, "Tm1req×Nm1" has a negative value. On the other hand, "Tm2req×Nm2" represents the second MG discharge power. As described above, during the batteryless travel control (during forward movement), second MG 400 rotates normally to generate the discharge torque (Nm2>0 and Tm2req>0), and thus, "Tm2req×Nm2" has a positive value. Therefore, the equation (3) is a relational equation indicating that the magnitude (absolute value) of the first MG generation power becomes equal to the magnitude (absolute value) of the second MG discharge power.

In S07, ECU 1000 sets calculated first MG target torque Tm1req and second MG target torque Tm2req to first MG command torque Tm1com and second MG command torque Tm2com, respectively. Then, ECU 1000 controls PCU 600 (inverters 620 and 630) such that first MG torque Tm1 and second MG torque Tm2 become first MG command torque Tm1com and second MG command torque Tm2com, respectively.

FIG. 7 is a diagram showing, on the nomographic chart of power split device 300, one example of the control state of engine 100, first MG 200 and second MG 400 during the batteryless travel control.

During the batteryless travel control, feedback control of engine torque Te is executed by the engine F/B control such that engine rotation speed Ne is maintained at target rotation speed Nereq. Furthermore, first MG torque Tm1 and second MG torque Tm2 are controlled by the power balance control such that the first MG generation power (=|TM1×Nm1|) and the second MG discharge power (=|Tm2×Nm2|) have the same value. As a result, as shown in FIG. 7, during the batteryless travel control (during forward movement), engine 100 rotates normally (Ne>0), and based on the mechanical relation, first MG 200 rotates normally to generate the power generation torque (Nm1>0 and Tm1req<0), and second MG 400 rotates normally to generate the discharge torque (Nm2>0 and Tm2req>0).

As is derived from the equations (2) and (3) described above, the magnitude of the power generation torque of first MG 200 (absolute value of first MG torque Tm1) becomes greater as requested driving force Preq becomes greater.

<Restriction of Driving Force During Batteryless Travel Control>

When an attempt is made to generate the driving force in a state where engine rotation speed Ne is deviating to the side higher than target rotation speed Nereq during the batteryless travel control, it is concerned that engine rotation speed Ne drops and a power balance is broken due to a decrease in engine torque Te caused by the engine F/B control and generation of the power generation torque of first MG 200 caused by the power balance control.

Figure 8:
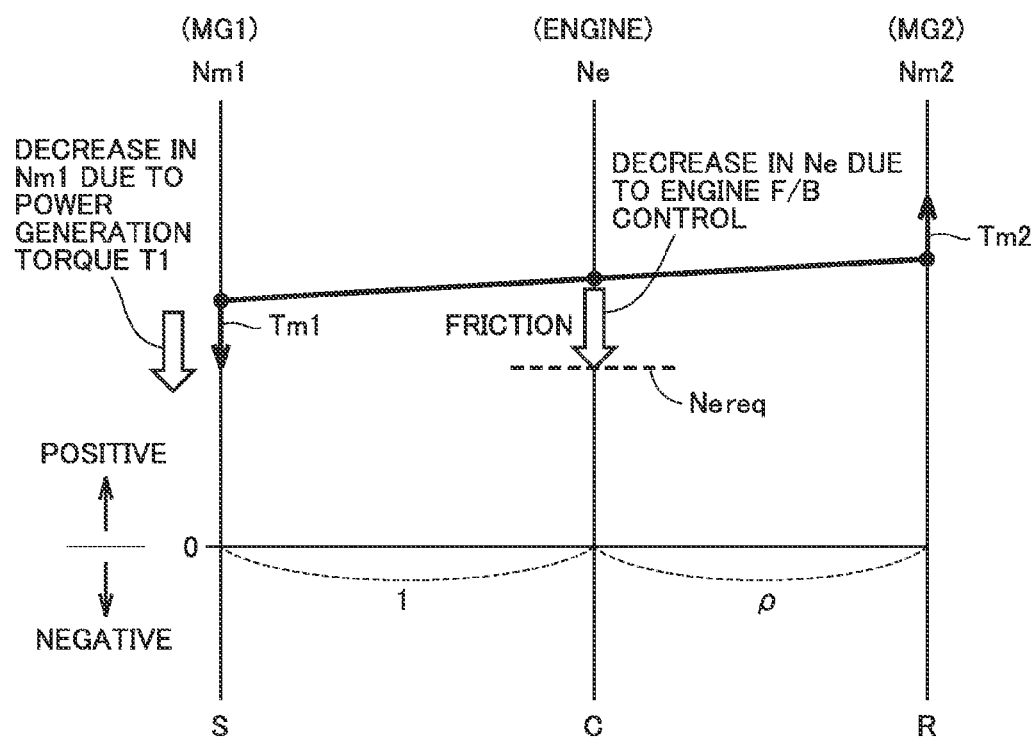
FIG. 8 is a diagram (No. 2) showing a control state during the batteryless travel control.

FIG. 8 is a diagram showing, on the nomographic chart of power split device 300, one example of the control state of engine 100, first MG 200 and second MG 400 in a case where engine rotation speed Ne is deviating to the side higher than target rotation speed Nereq during the batteryless travel control.

In a case where engine rotation speed Ne is deviating to the side higher than target rotation speed Nereq, engine torque Te is decreased to zero by the function of the engine F/B control. Therefore, due to engine friction, the torque acts on a crankshaft of engine 100 so as to decrease engine rotation speed Ne.

When an attempt is made to generate the driving force in such a state, first MG torque Tm1 functions toward the power generation side (in the negative direction). Based on the mechanical relation of power split device 300, first MG torque Tm1 (torque functioning toward the power generation side) functions to decrease engine rotation speed Ne. Therefore, engine rotation speed Ne drops sharply due to both the engine friction and first MG torque Tm1, and under this influence, first MG rotation speed Nm1 decreases as well and the first MG generation power (=|Tm1×Nm1|) decreases. As a result, it is concerned that the power balance between the first MG generation power and the second MG discharge power is broken.

The situation in which engine rotation speed Ne deviates to the side higher than target rotation speed Nereq during the batteryless travel control may occur, for example, when the user pressing the accelerator pedal stops pressing the accelerator pedal. Namely, when the user stops pressing the accelerator pedal, requested driving force Preq becomes zero, and under this influence, first MG torque Tm1 serving as reaction force of engine torque Te becomes zero momentarily. As a result, engine rotation speed Ne may blow up transiently (increase sharply) and deviate to the side higher than target rotation speed Nereq. When the user presses the accelerator pedal again in a state where engine rotation speed Ne is deviating to the side higher than target rotation speed Nereq as described above, it is concerned that the aforementioned drop in engine rotation speed Ne occurs and the power balance is broken because engine torque Te is zero by the engine F/B control and further first MG torque Tm1 functions in the negative direction (toward the power generation side).

Thus, when engine rotation speed Ne is higher than a value obtained by adding a prescribed value N1 (N1>0) to target rotation speed Nereq (hereinafter also referred to as "threshold speed") while the batteryless travel control is in execution, ECU 1000 according to the present embodiment sets a value of requested driving force Preq to be smaller than that when engine rotation speed Ne is lower than the threshold speed. Specifically, when engine rotation speed Ne is lower than the threshold speed, ECU 1000 sets an upper limit value of requested driving force Preq to Pmax1 which is a value during normal traveling. When engine rotation speed Ne is higher than the threshold speed, ECU 1000 sets the upper limit value of requested driving force Preq to a restriction value Pmax2 smaller than Pmax1 which is a value during normal traveling.

Here, restriction value Pmax2 is set to a value that restricts the magnitude of first MG torque Tm1 (power generation torque) to a level that does not cause a sharp drop in engine rotation speed Ne while the batteryless travel control is in execution and engine torque Te is zero. Namely, when engine rotation speed Ne is higher than the threshold speed, requested driving force Preq is restricted to restriction value Pmax2 even when the user requests the driving force exceeding restriction value Pmax2. As a result, the magnitude of first MG torque Tm1 (power generation torque) is restricted, and thus, a sharp drop in engine rotation speed Ne is prevented and a break of the power balance is prevented.

Figure 9:
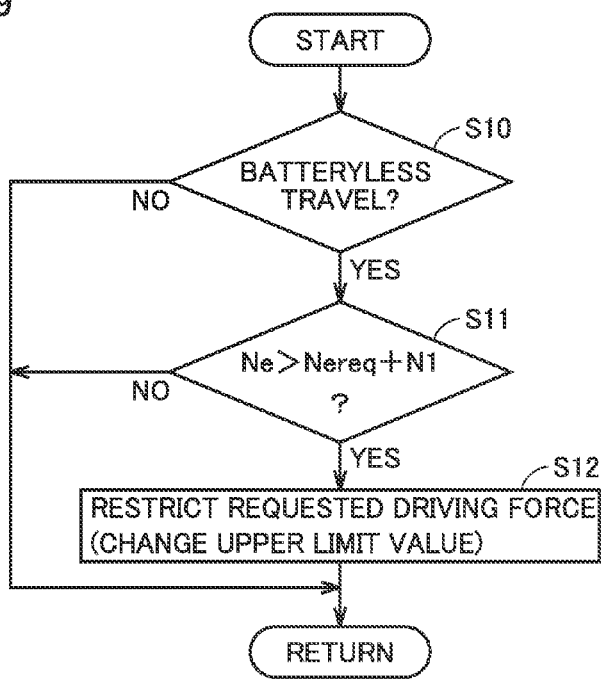
FIG. 9 is a flowchart (No. 2) showing a process procedure by the ECU.

FIG. 9 is a flowchart showing a process procedure for restriction of the driving force executed by ECU 1000 during the batteryless travel control.

In S10, ECU 1000 determines whether or not the batteryless travel control is in execution. If the batteryless travel control is not in execution (NO in S10), ECU 1000 ends the process.

If the batteryless travel control is in execution (YES in S10), ECU 1000 determines in S11 whether or not engine rotation speed Ne is higher than the aforementioned threshold speed (value obtained by adding prescribed value N1 to target rotation speed Nereq).

If engine rotation speed Ne is lower than the threshold speed (NO in S11), ECU 1000 ends the process. In this case, the upper limit value of requested driving force Preq is maintained at Pmax1 which is a value during normal traveling.

On the other hand, if engine rotation speed Ne is higher than the threshold speed (YES in S11), ECU 1000 restricts requested driving force Preq in S12. More specifically, ECU 1000 sets the upper limit value of requested driving force Preq to restriction value Pmax2 smaller than Pmax1 which is a value during normal traveling. As a result, requested driving force Preq is restricted to restriction value Pmax2 even when the user requests the driving force exceeding restriction value Pmax2. As a result, the magnitude of first MG torque Tm1 (power generation torque) is restricted, and thus, a sharp drop in engine rotation speed Ne is prevented.

As described above, when engine rotation speed Ne is higher than the threshold speed (=Nereq+N1) during the batteryless travel control, ECU 1000 according to the present embodiment restricts requested driving force Preq used for the power balance control, thereby preventing a drop in engine rotation speed Ne. As a result, even when engine rotation speed Ne deviates to the side higher than target rotation speed Nereq during the batteryless travel control, a break of the power balance is prevented.

Modification of First Embodiment

In the first embodiment described above, the driving force has been restricted by setting the upper limit value of requested driving force Preq to a small value during the batteryless travel control. However, the method for restricting requested driving force Preq is not limited thereto. The driving force may be restricted, for example, by decreasing requested driving force Preq itself.

In addition, in the first embodiment described above, whether to restrict the driving force has been determined based on whether or not engine rotation speed Ne is higher than the threshold speed during the batteryless travel control. However, the condition for restricting the driving force is not limited thereto. For example, when the batteryless travel control is started, the driving force may be preliminarily restricted temporarily, without determining whether or not engine rotation speed Ne is higher than the threshold speed.

Figure 10:
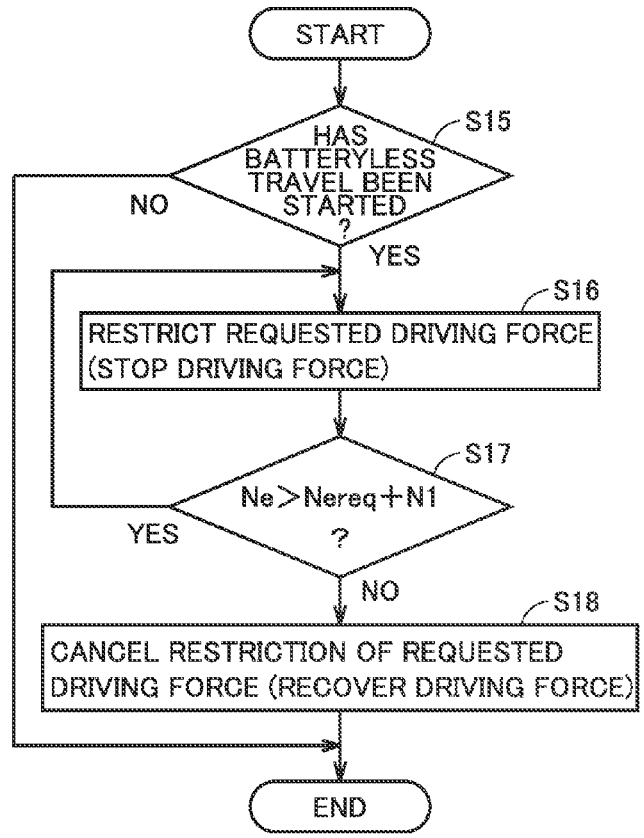
FIG. 10 is a flowchart (No. 3) showing a process procedure by the ECU.

FIG. 10 is a flowchart showing a process procedure for restriction of the driving force executed by ECU 1000 according to the present modification at the start of the batteryless travel control.

In S15, ECU 1000 determines whether or not the batteryless travel control has been started (i.e., whether or not transition has been made from the state of the batteryless travel control being not in execution to the state of the batteryless travel control being ready for execution).

If the batteryless travel control has not been started (NO in S15), ECU 1000 ends the process.

If the batteryless travel control has been started (YES in S15), ECU 1000 decreases requested driving force Preq from a user request value (value corresponding to accelerator pedal operation amount A and vehicle speed V) to zero in S16. As a result, first MG torque Tm1 (power generation torque) becomes zero and the vehicle driving force is stopped.

In S17, ECU 1000 determines whether or not engine rotation speed Ne is higher than the threshold speed (=Nereq+N1). If engine rotation speed Ne is higher than the threshold speed (YES in S17), ECU 1000 returns the process to S16 and maintains requested driving force Preq at zero.

If engine rotation speed Ne is lower than the threshold speed (NO in S17), ECU 1000 moves the process to S18 and recovers requested driving force Preq from zero to the user request value. As a result, first MG torque Tm1 (power generation torque) is recovered and the vehicle driving force is recovered.

FIG. 11 is a diagram showing a manner of change in requested driving force Preq, first MG torque Tm1 and engine rotation speed Ne at the start of the batteryless travel control.

When transition to the batteryless travel control is started at time t1, requested driving force Preq is decreased from the user request value (value corresponding to accelerator pedal operation amount A and vehicle speed V) to zero. Therefore, first MG torque Tm1 (power generation torque) becomes zero. As a result, engine rotation speed Ne blows up transiently, and thereafter, engine rotation speed Ne decreases slowly due to the engine friction. Namely, if requested driving force Preq is maintained at the user request value, first MG torque Tm1 functions to decrease engine rotation speed Ne, and thus, it is concerned that engine rotation speed Ne decreases sharply. However, in the present modification, first MG torque Tm1 (power generation torque) is restricted to zero, and thus, engine rotation speed Ne decreases slowly due to the engine friction.

Then, when engine rotation speed Ne decreases to the threshold speed (=Nereq+N1) at time t2, requested driving force Preq is recovered from zero to the user request value and first MG torque Tm1 (power generation torque) is recovered. When engine rotation speed Ne subsequently decreases to below target rotation speed Nereq, engine torque Te is recovered by the engine F/B control. Therefore, even when first MG torque Tm1 functions, a sharp drop in engine rotation speed Ne is avoided.

As described above, in the present modification, at the start of the batteryless travel control, requested driving force Preq is set to zero and first MG torque Tm1 is preliminarily restricted temporarily, and when engine rotation speed Ne decreases to the threshold speed, requested driving force Preq is recovered and first MG torque Tm1 (power generation torque) is generated. With this, a drop in engine rotation speed Ne is appropriately prevented at the start of the batteryless travel control, and thus, a break of the power balance can be avoided and smooth transition to the batteryless travel control can be made.

Second Embodiment

In the first embodiment described above, a drop in engine rotation speed Ne has been prevented by restricting requested driving force Preq used for the power balance control, in a case where engine rotation speed Ne deviates to the side higher than target rotation speed Nereq during the batteryless travel control.

However, when requested driving force Preq is great, a drop in engine rotation speed Ne may be prevented by restricting the function of the engine F/B control (function of decreasing engine rotation speed Ne toward target rotation speed Nereq), instead of restricting requested driving force Preq, in order to satisfy the user's request.

As the specific process for restricting the function of the engine F/B control, at least one of a process for decreasing a feedback gain K and a process for increasing target rotation speed Nereq may be executed.

When the process for decreasing feedback gain K is executed, the speed of decrease in engine torque Te (throttle opening degree θth) becomes slow, and thus, the speed of decrease in engine rotation speed Ne can be made slow. In addition, by setting feedback gain K to zero, engine torque Te can also be maintained without any decrease.

When the process for increasing target rotation speed Nereq is executed, an amount of decrease in engine rotation speed Ne can be reduced. In addition, by setting target rotation speed Nereq to engine rotation speed Ne, engine rotation speed Ne can also be maintained without any decrease.

FIG. 12 is a flowchart showing a process procedure for restriction of the driving force executed by ECU 1000 according to a second embodiment during the batteryless travel control. Of the steps shown in FIG. 12, the steps indicated by the same reference numerals as those of the steps shown in FIG. 9 described above have already been described, and thus, detailed description will not be repeated here.

If the batteryless travel control is in execution (YES in S10) and engine rotation speed Ne is higher than the threshold speed (=Nereq+N1) (YES in S11), ECU 1000 determines in S20 whether or not requested driving force Preq is greater than a threshold driving force P1.

If requested driving force Preq is greater than threshold driving force P1 (YES in S20), ECU 1000 restricts the function of the engine FIB control in S21. Specifically, as described above, ECU 1000 executes at least one of the process for decreasing feedback gain K and the process for increasing target rotation speed Nereq.

As described above, when engine rotation speed Ne is deviating to the side higher than target rotation speed Nereq and requested driving force Preq is greater than threshold driving force P1 while the batteryless travel control is in execution, ECU 1000 according to the present embodiment restricts the function of the engine F/B control. With this, in response to the user's request, a drop in engine rotation speed Ne can be prevented without restricting the driving force.

Third Embodiment

In the second embodiment described above, a drop in engine rotation speed Ne has been prevented by restricting the function of the engine F/B control in a case where engine rotation speed Ne deviates to the side higher than target rotation speed Nereq during the batteryless travel control.

However, when engine rotation speed Ne remains at a high value by restricting the function of the engine F/B control, first MG rotation speed Nm1 may also remain at a high value based on the relation on the nomographic chart of power split device 300. When first MG rotation speed Nm1 is high, it is concerned that the control mode of first MG 200 becomes the rectangular wave control mode that is inferior in control accuracy to the PWM control mode (see FIG. 5 described above), and the first MG generation power cannot be accurately matched with the second MG discharge power, which leads to a break of the power balance.

Thus, in a third embodiment, based on whether or not the control mode of first MG 200 is the rectangular wave control mode, selection is made between prevention of a drop in engine rotation speed Ne by restricting the function of the engine F/B control and prevention of a drop in engine rotation speed Ne by restricting requested driving force Preq. The remaining structure, function and process are the same as those of the first and second embodiments described above, and thus, detailed description will not be repeated here.

FIG. 13 is a flowchart showing a process procedure for restriction of the driving force executed by ECU 1000 according to the third embodiment during the batteryless travel control. Of the steps shown in FIG. 13, the steps indicated by the same reference numerals as those of the steps shown in FIG. 12 described above have already been described, and thus, detailed description will not be repeated here.

If the batteryless travel control is in execution (YES in S10) and engine rotation speed Ne is higher than the threshold speed (=Nereq+N1) (YES in S11) and requested driving force Preq is greater than threshold driving force P1 (YES in S20), ECU 1000 determines in S30 whether or not the control mode of first MG 200 is the rectangular wave control mode. If the operating point of first MG 200 is included in region A2 shown in FIG. 5 described above, ECU 1000 determines that the control mode of first MG 200 is the rectangular wave control mode.

If the control mode of first MG 200 is not the rectangular wave control mode (NO in S30), i.e., if the control mode of first MG 200 is the PWM control mode, ECU 1000 restricts the function of the engine F/B control in S21.

On the other hand, if the control mode of first MG 200 is the rectangular wave control mode (YES in S30), ECU 1000 restricts requested driving force Preq in S12.

As described above, when the control mode of first MG 200 is the rectangular wave control mode, a drop in engine rotation speed Ne is prevented by restricting requested driving force Preq used for the power balance control, not by restricting the function of the engine F/B control. Therefore, as compared with the case of restricting the function of the engine F/B control, the situation in which engine rotation speed Ne remains at a value higher than target rotation speed Nereq is suppressed, and thus, the situation in which first MG rotation speed Nm1 remains at a high value is also suppressed. As a result, the control mode of first MG 200 can be encouraged to switch to the PWM control mode that is superior in control accuracy to the rectangular wave control mode. When the control mode of first MG 200 switches to the PWM control mode, the first MG generation power can be accurately matched with the second MG discharge power. As a result, a break of the power balance can be prevented more appropriately.

On the other hand, when the control mode of first MG 200 is the PWM control mode, a drop in engine rotation speed Ne is prevented by restricting the function of the engine F/B control, not by restricting requested driving force Preq used for the power balance control. Therefore, a drop in engine rotation speed Ne can be prevented without restricting the driving force.

The processing in S20 may be omitted in FIG. 13.

Fourth Embodiment

In the third embodiment described above, based on whether or not the control mode of first MG 200 is the rectangular wave control mode, selection has been made between restriction of the function of the engine F/B control and restriction of requested driving force Preq.

In contrast, in a fourth embodiment, based on whether or not requested driving force Preq is greater than threshold driving force P1, selection is made between restriction of the function of the engine F/B control and restriction of requested driving force Preq. The remaining structure, function and process are the same as those of the first and second embodiments described above, and thus, detailed description will not be repeated here.

FIG. 14 is a flowchart showing a process procedure for restriction of the driving force executed by ECU 1000 according to the present embodiment during the batteryless travel control. Of the steps shown in FIG. 14, the steps indicated by the same reference numerals as those of the steps shown in FIG. 13 described above have already been described, and thus, detailed description will not be repeated here.

If the batteryless travel control is in execution (YES in S10), ECU 1000 determines whether or not engine rotation speed Ne is higher than the threshold speed (=Nereq+N1) (S11), and determines whether or not requested driving force Preq is greater than threshold driving force P1 (S20).

If engine rotation speed Ne is higher than the threshold speed (=Nereq+N1) (YES in S11) and requested driving force Preq is greater than threshold driving force P1 (YES in S20), ECU 1000 restricts the function of the engine F/B control in S21.

If engine rotation speed Ne is higher than the threshold speed (=Nereq+N1) (YES in S11) and requested driving force Preq is smaller than threshold driving force P1 (NO in S20), ECU 1000 restricts requested driving force Preq in S12.

With this, when requested driving force Preq is great, a drop in engine rotation speed Ne can be prevented by restricting the function of the engine F/B control, without restricting the driving force. When requested driving force Preq is small, a drop in engine rotation speed Ne can be prevented by restricting requested driving force Preq.

The embodiments and modification described above can also be combined as appropriate within a range that does not cause any technical contradiction.

While the embodiments of the present disclosure have been described, it should be understood that the embodiments disclosed herein are illustrative and not limitative in any respect. The scope of the present subject matter is defined by the terms of the claims, and is intended to include any modifications within the scope and meaning equivalent to the terms of the claims.

What is claimed is:

1. A driving device for a vehicle, comprising:
an engine;
a first rotating electric machine;
a second rotating electric machine connected to a driving wheel;
a planetary gear mechanism having a rotating element connected to the engine, a rotating element connected to the first rotating electric machine, and a rotating element connected to the second rotating electric machine, the planetary gear mechanism mechanically connecting the engine, the first rotating electric machine and the second rotating electric machine such that when a rotation speed of one of the engine and the first rotating electric machine decreases in a case where a rotation speed of the second rotating electric machine is constant, a rotation speed of the other of the engine and the first rotating electric machine decreases;
a battery configured to be electrically connectable to the first rotating electric machine and the second rotating electric machine; and
a controller configured, when the battery is abnormal, to disconnect the battery from the first rotating electric machine and the second rotating electric machine and to execute batteryless travel control,
the batteryless travel control being control that executes:
(i) engine feedback control for executing feedback control of the engine such that the rotation speed of the engine becomes a target rotation speed; and
(ii) power balance control for controlling the first rotating electric machine and the second rotating electric machine such that a power corresponding to a requested driving force is transmitted to the driving wheel and a power generated by the first rotating electric machine becomes equal to a power consumed by the second rotating electric machine, and
when the rotation speed of the engine is higher than a threshold speed higher than the target rotation speed during the batteryless travel control, the controller being configured to set a value of the requested driving force used for the power balance control to be smaller than that when the rotation speed of the engine is lower than the threshold speed.

2. The driving device according to claim 1, wherein the first rotating electric machine is controlled:
(i) in a pulse width modulation control mode when the rotation speed of the first rotating electric machine is lower than a prescribed value; and
(ii) in a rectangular wave control mode when the rotation speed of the first rotating electric machine is higher than the prescribed value, and
when the rotation speed of the engine is higher than the threshold speed and the first rotating electric machine is controlled in the rectangular wave control mode during the batteryless travel control, the controller is configured to set the value of the requested driving force to be smaller than that when the rotation speed of the engine is lower than the threshold speed, and
when the rotation speed of the engine is higher than the threshold speed and the first rotating electric machine is controlled in the pulse width modulation control mode during the batteryless travel control, the controller is configured to execute at least one of a first process and a second process, the first process being a process for decreasing a gain used for the engine feedback control as compared with the gain when the rotation speed of the engine is lower than the threshold speed, the second process being a process for increasing the target rotation speed as compared with the target rotation speed when the rotation speed of the engine is lower than the threshold speed.

3. A driving device for a vehicle, comprising:
an engine;
a first rotating electric machine;
a second rotating electric machine connected to a driving wheel;
a planetary gear mechanism having a rotating element connected to the engine, a rotating element connected to the first rotating electric machine, and a rotating element connected to the second rotating electric machine, the planetary gear mechanism mechanically connecting the engine, the first rotating electric machine and the second rotating electric machine such that when a rotation speed of one of the engine and the first rotating electric machine decreases in a case where a rotation speed of the second rotating electric machine is constant, a rotation speed of the other of the engine and the first rotating electric machine decreases;
a battery configured to be electrically connectable to the first rotating electric machine and the second rotating electric machine; and
a controller configured, when the battery is abnormal, to disconnect the battery from the first rotating electric machine and the second rotating electric machine and to execute batteryless travel control,
the batteryless travel control being control that executes:
(i) engine feedback control for executing feedback control of the engine such that the rotation speed of the engine becomes a target rotation speed; and
(ii) power balance control for controlling the first rotating electric machine and the second rotating electric machine such that a power corresponding to a requested driving force is transmitted to the driving wheel and a power generated by the first rotating electric machine becomes equal to a power consumed by the second rotating electric machine, and
when the rotation speed of the engine is higher than a threshold speed higher than the target rotation speed and the requested driving force is greater than a threshold driving force during the batteryless travel control, the controller being configured to execute at least one of a first process and a second process, the first process being a process for decreasing a gain used for the engine feedback control as compared with the gain at least one of when the rotation speed of the engine is lower than the threshold speed and when the requested driving force is smaller than the threshold driving force, the second process being a process for increasing the target rotation speed as compared with the target rotation speed at least one of when the rotation speed of the engine is lower than the threshold speed and when the requested driving force is smaller than the threshold driving force.

* * * * *